US012692774B2

(12) United States Patent
Mamtimin et al.

(10) Patent No.: US 12,692,774 B2
(45) Date of Patent: Jul. 28, 2026

(54) UNIFIED FRAMEWORK FOR ADAPTIVE MODELING WITH DENSITY INCREASING FEEDBACK

(71) Applicant: Halliburton Energy Services, Inc., Houston, TX (US)

(72) Inventors: Mayir Mamtimin, Spring, TX (US); Jeffrey James Crawford, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1243 days.

(21) Appl. No.: 17/644,876

(22) Filed: Dec. 17, 2021

(65) Prior Publication Data

US 2023/0193731 A1     Jun. 22, 2023

(51) Int. Cl.
| | |
|---|---|
| *E21B 43/25* | (2006.01) |
| *G06F 18/214* | (2023.01) |
| *G06N 20/00* | (2019.01) |

(52) U.S. Cl.
CPC ............ *E21B 43/25* (2013.01); *G06F 18/214* (2023.01); *G06N 20/00* (2019.01)

(58) Field of Classification Search
None
See application file for complete search history.

(56) References Cited

U.S. PATENT DOCUMENTS

| | | |
|---|---|---|
| 7,139,764 B2 | 11/2006 | Lee |
| 9,946,974 B2 | 4/2018 | Burch et al. |

| | | |
|---|---|---|
| 10,260,319 B2 | 4/2019 | Sarduy et al. |
| 10,677,052 B2 | 6/2020 | Storm |
| 2017/0058666 A1 | 3/2017 | Chen et al. |
| 2018/0225850 A1 | 8/2018 | Ramsay et al. |
| 2020/0183047 A1 | 6/2020 | Denli et al. |

(Continued)

FOREIGN PATENT DOCUMENTS

| | | |
|---|---|---|
| WO | 2020069378 A1 | 4/2020 |
| WO | 2020185697 A1 | 9/2020 |

OTHER PUBLICATIONS

Zhang et al "A self-training semi-supervised machine learning method for predictive mapping of soil classes with limited sample data", 2021, ScienceDirect "eleservier" Geoderma 384 , 114809.*

(Continued)

*Primary Examiner* — Kamini S Shah
(74) *Attorney, Agent, or Firm* — DeLizio, Peacock, Lewin & Guerra LLP

(57) ABSTRACT

A unified framework has been designed to create and maintain a set of adaptable general models that can be deployed and efficiently trained to fit to various deployments. The unified framework incrementally fills the feature space of a high dimensionality training dataset with field observations to reduce sparseness, trains and retrains a model set with the changing global training dataset, and then deploys a selected adaptable general model for training/ fitting to a specified deployment scenario. Data that is generated by deployment adapted models can be validated and then added to the global training dataset that is used to train and update the general models. With the increasing density of the global training dataset, the general models can more quickly converge for a deployment scenario.

14 Claims, 4 Drawing Sheets

(56) References Cited

U.S. PATENT DOCUMENTS

| | | | |
|---|---|---|---|
| 2021/0285326 A1* | 9/2021 | Alghazal | G01V 99/00 |
| 2021/0310307 A1 | 10/2021 | Panchal et al. | |
| 2021/0326721 A1* | 10/2021 | Zhang | G06N 5/04 |
| 2021/0381362 A1 | 12/2021 | Cha et al. | |
| 2022/0129788 A1* | 4/2022 | Zhang | E21B 49/00 |
| 2023/0097859 A1* | 3/2023 | AlSinan | G06N 3/09 |
| | | | 703/6 |

OTHER PUBLICATIONS

"PCT Application No. PCT/US2021/073037, International Search Report and Written Opinion", Sep. 5, 2022, 8 pages.

Benaouda, et al., "Inferring the lithology of borehole rocks by applying neural network classifiers to downhole logs: an example from the Ocean Drilling Program", in Geophysical Journal International vol. 136, issue 2., Feb. 1, 1999, 477-491.

* cited by examiner

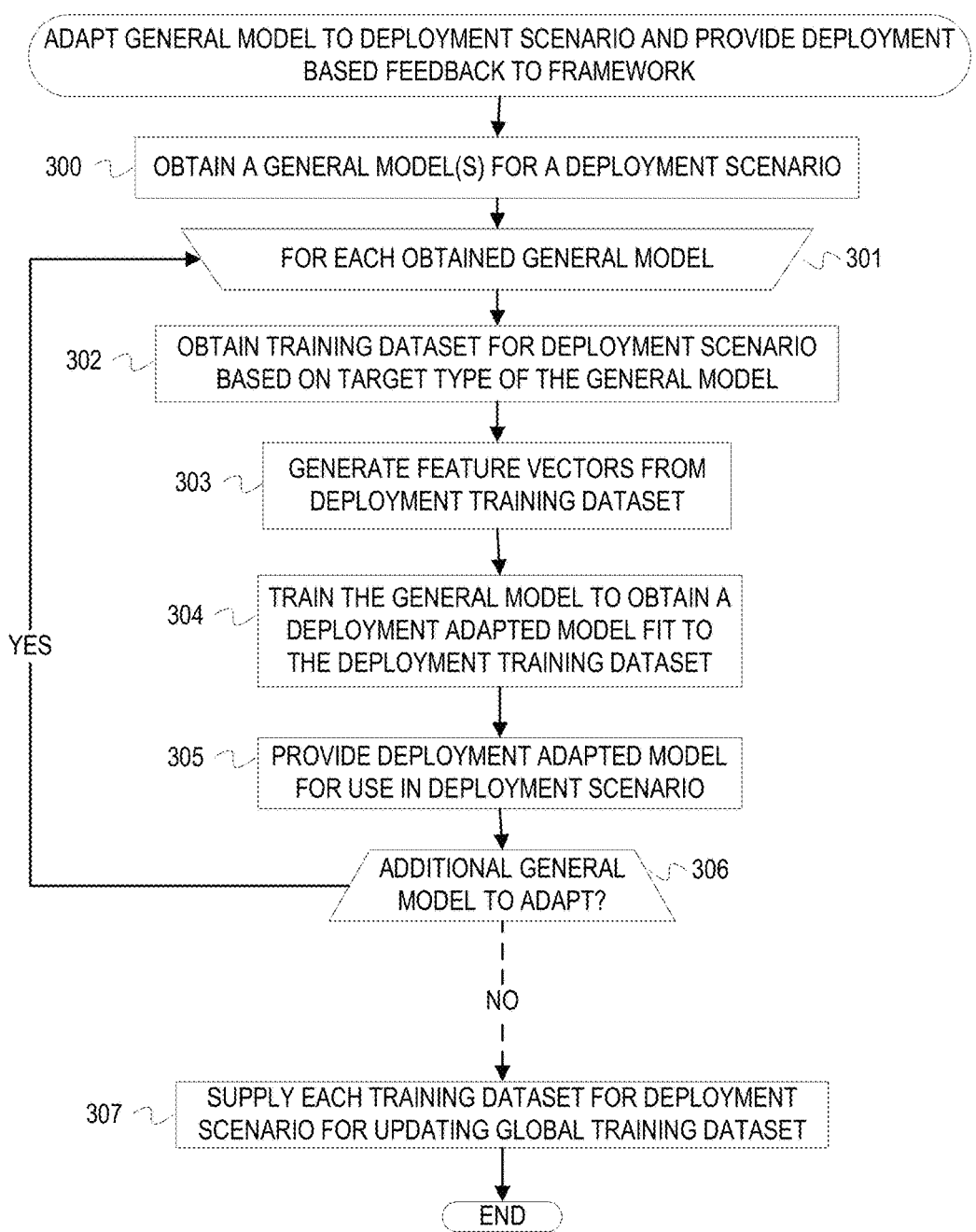

ADAPT GENERAL MODEL TO DEPLOYMENT SCENARIO AND PROVIDE DEPLOYMENT
BASED FEEDBACK TO FRAMEWORK

300  OBTAIN A GENERAL MODEL(S) FOR A DEPLOYMENT SCENARIO

FOR EACH OBTAINED GENERAL MODEL  301

302  OBTAIN TRAINING DATASET FOR DEPLOYMENT SCENARIO
BASED ON TARGET TYPE OF THE GENERAL MODEL

303  GENERATE FEATURE VECTORS FROM
DEPLOYMENT TRAINING DATASET

304  TRAIN THE GENERAL MODEL TO OBTAIN A
DEPLOYMENT ADAPTED MODEL FIT TO
THE DEPLOYMENT TRAINING DATASET

305  PROVIDE DEPLOYMENT ADAPTED MODEL
FOR USE IN DEPLOYMENT SCENARIO

ADDITIONAL GENERAL  306
MODEL TO ADAPT?

YES

NO

307  SUPPLY EACH TRAINING DATASET FOR DEPLOYMENT
SCENARIO FOR UPDATING GLOBAL TRAINING DATASET

END

FIG. 3

401 Processor

407 Memory

Bus

405 Network Interface

Unified Framework For Adaptable Models 411

403

UNIFIED FRAMEWORK FOR ADAPTIVE MODELING WITH DENSITY INCREASING FEEDBACK

TECHNICAL FIELD

The disclosure generally relates to the field of Data Processing; Artificial Intelligence (AI)) and Application Using AI. The disclosure also relates to Hydraulic and Earth Engineering and Subterranean Waste Disposal, Containment, or Treatment.

BACKGROUND

Models are widely used throughout the oil and gas industry to assist in accurately interpreting complex data and predicting outputs associated with the extraction of oil and natural gas. In oil and gas operations, a wellbore is drilled through the subsurface to a target geologic formation, also referred to as a reservoir, which contains oil and natural gas. Exploring for and extracting oil and natural gas from a reservoir is high risk due to several unknown features when drilling a wellbore into an unfamiliar reservoir. Petrophysical parameters of the reservoir can be obtained and interpreted, but the sheer volume of data and large variable space complicates reservoir characterization and simulation such that a petrophysical parameter may not accurately represent the reservoir. Models are trained and deployed for specific scenarios in the oil and gas industry to interpret data in a large variable space and generate accurate predictions that assist in reducing risk of exploring for and extracting oil and natural gas. For example, models can be trained for a specific scenario to predict lithology types, the quantity of fluids located in the pore space of a reservoir, the distribution of the fluids throughout a reservoir, and the ability to extract the fluids from a reservoir, all of which play a crucial role in exploration, field development, and production strategies.

BRIEF DESCRIPTION OF THE DRAWINGS

Embodiments of the disclosure may be better understood by referencing the accompanying drawings.

FIG. 3 is a flowchart of example operations for adapting a general model to a deployment scenario and providing deployment-based feedback to the unified adaptable model framework.

DESCRIPTION OF EMBODIMENTS

Figure 1:
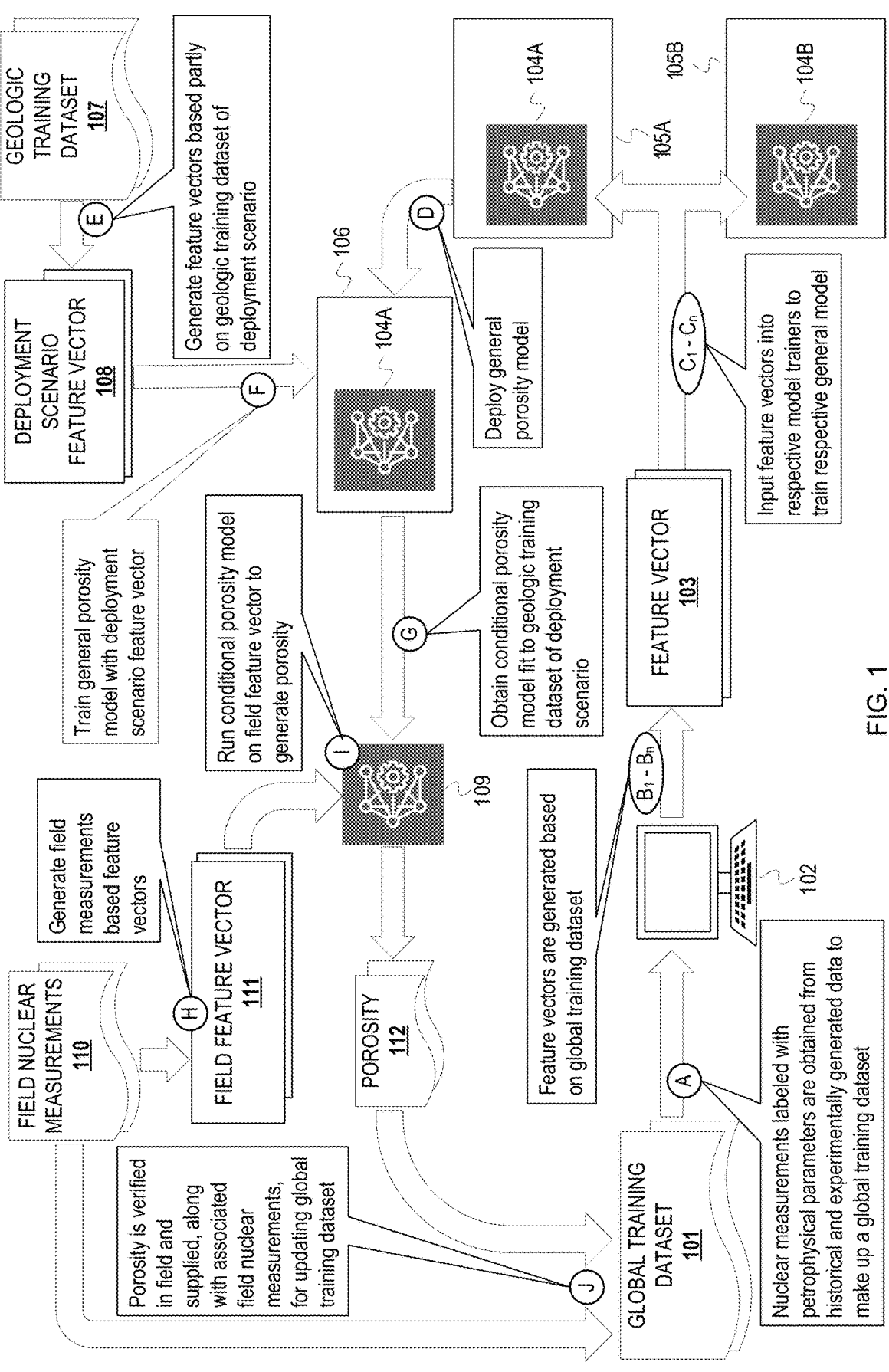
FIG. 1 is a conceptual diagram of a unified framework that creates and maintains a set of adaptable models that can be deployed and efficiently trained to fit various scenarios.

The description that follows includes example systems, methods, techniques, and program flows that embody embodiments of the disclosure. However, it is understood that this disclosure may be practiced without these specific details. For instance, this disclosure refers to a unified framework of adapted models for generating petrophysical parameters with nuclear measurements in illustrative examples. Embodiments of this disclosure can be also applied to a unified framework of adapted models for generating petrophysical parameters with other measurement logs such as acoustic measurements. In other instances, well-known instruction instances, protocols, structures, and techniques have not been shown in detail in order not to obfuscate the description.

Overview

Modeling is used in various capacities of resource exploration and hydrocarbon recovery. Example uses include predicting and/or classifying petrophysical parameters at different geographic granularities ranging from an individual well to geographic regions encompassing a continent. The number of variables or features available for consideration in creating and training a model for energy exploration or extraction is large. Thus, dimensionality reduction is employed to avoid creating a model that suffers from underfitting for an intended deployment.

A unified framework has been designed that creates and maintains a set of adaptable general models that can be deployed and efficiently trained to fit to various deployments. The unified framework incrementally fills the feature space of a high dimensionality training dataset ("global training dataset") with field observations to reduce sparseness, trains and retrains a model set with the changing global training dataset, and then deploys a selected adaptable general model for training/fitting to a specified deployment scenario. Training an adaptable general model to fit a deployment scenario injects specificity into the adaptable general model to create a deployment adapted model with increased accuracy of petrophysical parameter(s) output for the deployment scenario. The adaptable general models (hereinafter "general models") can be tailored, for example, towards a geologic zone that contains a specific lithology, or a wellbore configuration such as an open hole or cased hole. Data that is generated by deployment adapted models can be validated and then added to the global training dataset that is used to train and update the general models. With density of the global training dataset increasing, the general models can more quickly converge for a deployment scenario.

Terminology

The term "feature" is used as understood in the field of machine learning to mean a measurable property or characteristic of a phenomenon. A feature can also be described as based on a variable that relates to the phenomenon that has been selected to be one of multiple features that form a feature vector. For this description, a feature is expressed as a numerical value. Thus, a value of a selected variable that is not a numerical type of variable would be transformed into a numerical feature (e.g., with one hot encoding). The features are organized to form an n-dimensional feature vector as appropriate for a consuming model. A feature vector with values can be referred to as a feature vector instance, datapoint, or observation, regardless of source (e.g., synthetic versus field sourced).

Example Illustrations

FIG. 1 is a conceptual diagram of a unified framework that creates and maintains a set of adaptable models that can be deployed and efficiently trained to fit various scenarios. FIG. 1 includes a global training dataset 101 for a high dimensionality feature space. The illustration depicts general models 104A and 104B that are trained with model trainer 105A and 105B, respectively. Model trainers 105A, 105B represent learning algorithms for a model type of the respective models. For this illustration, the model trainers 105A, 105B ("model trainers 105") train the respective general models 104A, 104B ("general models 104") with the global training dataset 101. FIG. 1 illustrates general model 104A being deployed and trained with model trainer 106 to create a deployment adapted model 109. Model trainer 106 represents a training algorithm for the model type of general model 104A that trains the deployed general model 104A with geologic training dataset 107. For this illustration, the general model 104A and the deployment adapted model 109 output porosity. FIG. 1 illustrates deployment adapted model 109 generating porosity 112 which is then supplied back to update global training dataset 101.

The example unified framework illustrated in FIG. 1 portrays a single deployment scenario, a single target type, and two general models for simplicity. The unified framework disclosed in this application is not limited to one deployment scenario and can involve multiple deployment scenarios which then supply the global training dataset with a variety of data to reduce sparseness of the feature space of the global training dataset 101. The unified framework disclosed in this application is not limited to one target type and will often comprise multiple general models comprising multiple model types that correlate to multiple target types that are then deployed to create multiple deployment adapted models for the respective target types. FIG. 1 is annotated with a series of letters A-J. These letters represent stages of operations, each of which can be one or more operations. Although these stages are ordered for this example, the stages illustrate one example to aid in understanding this disclosure and should not be used to limit the claims. Subject matter falling within the scope of the claims can vary with respect to the order and some of the operations.

At stage A, a global training dataset 101 is obtained and processed with program code hosted on a computer 102. Synthetic measurement logs obtained from a variety of sources including historical data, computer models, and experimentally generated data are expertly labeled with petrophysical parameters to generate the global training dataset 101. The global training dataset 101 comprises labeled datapoints. The feature space can include a few features to hundreds of features. Since a single feature itself may be an array of vector, a feature space can be considered high dimensionality with several to ten features, for example.

At stages $B_1$-$B_n$, the system 102 generates feature vectors 103 based on the target types represented in global training dataset 101. At each of the stages $B_1$-$B_n$, the system 102 generates multiple of the feature vectors 103 for each target type corresponding to the stage—a first target type at stage $B_1$, a second target type at stage $B_2$, etc. Features of the feature vectors 103 are numerical values or representations from measurement logs such as nuclear measurements. While the features of the feature vectors 103 will be common across the target types and models, the labels or targets will vary depending on the target type. For example, labels for training a model to predict porosity will differ from the labels for training a model to predict water saturation.

At stages $C_1$-$C_n$, the system 102 inputs the feature vectors 103 into model trainers 105 for training the respective untrained general models 104 to fit the global training dataset 101. The system 102 can batch input the feature vectors 103 or individually input the feature vectors 103 depending upon the model trainer 105. For this illustration, general porosity model 104A is trained by the model trainer 105A to fit the global training dataset 101. The model trainers 105 train the general models 104 according to an underlying training algorithm. Due to global training dataset 101 sparsely populating the large variable space, the training of the general models 104 will yield trained, underfit models for the high dimensionality variable space that output target types when presented with measurement logs. A general model is generated for each target type. For example, general model 104B may be intended to predict water saturation and is trained and generated by its own model trainer 105B. General model 104B can correspond to a different target type but it is also underfit for the high dimensionality variable space because it is trained to fit global training dataset 101 as well.

At stage D, general porosity model 104A is deployed to the field to be trained/fit to a specified deployment scenario. The deployment scenarios likely use a subset of the features of the global training dataset 101 features. The subset of features is those considered to be most relevant for the deployment scenario. FIG. 1 depicts an example of a geologic scenario for simplicity and is not to be used to limit the scope of the claims.

At stage E, a system of the deployment scenario generates deployment scenario feature vectors 108 based on the porosity target type represented in the geologic training dataset 107. The geologic training dataset 107 is data collected in the field and labeled with porosity. The geologic training dataset 107 and deployment scenario feature vectors 108 represent the geologic deployment scenario that the general model will be tailored towards. For example, if the geologic deployment scenario example specifies a single lithology type, then the deployment scenario feature vectors 108 will provide a numerical representation of porosity based on the scenario with the specific lithology type.

At stage F, the deployment scenario system inputs the deployment scenario feature vectors 108 into the model trainer 106 for training the general porosity model 104A. The system can batch input deployment scenario feature vectors 108 or individually input the deployment scenario feature vectors 108 depending upon the model trainer 106.

At stage G, the model trainer 106 trains the general porosity model 104A according to an underlying training algorithm to generate a deployment adapted porosity model 109 that is fit to the geologic training dataset 107 of the deployment scenario. Training the general porosity model 104A to fit the geologic training dataset 107 injects specificity into the general porosity model 104A to create a model with increased accuracy of porosity predictions for the geologic deployment scenario. The variability of deployment adapted porosity model 109 is reduced compared to the general porosity model 104A fit to the global training dataset 101 because the model is now refined for the deployment scenario.

At stage H, field nuclear measurements 110 are obtained and processed. The field nuclear measurements 110 can be obtained from logging tools such as a pulsed neutron log. The field nuclear measurements can be obtained from a single wellbore or multiple wellbores. The deployment scenario system generates a field feature vectors 111 based on the field nuclear measurements 110.

At stage I, the field feature vectors 111 are input into deployment adapted porosity model 109 to output porosity predictions 112.

At stage J, the porosity predictions 112 are validated and then supplied back to the global training dataset 101, along with the associated field nuclear measurements 110. Porosity predictions 112 can be validated in the field by various methods such as by experts or computer models. The datapoints (nuclear field measurements 110 labeled with validated porosity predictions 112) are added to the global training dataset 101. The updated global training dataset 101 can be used to retrain and update the general models 104 as more datapoints from the variety of deployment scenarios are added. As the density of the global training dataset 101 is increased, more of the variable space is filled in such that the general models 104 can more quickly converge for a deployment scenario. The nuclear measurements 110 and porosity predictions 112 output by the deployment adapted porosity model 109 can also be supplied back to update the geologic training dataset 107. Like the global training dataset 101 and general models 104, the geologic training dataset 107 can continue to retrain and update the deployment adapted porosity model 109 as the geologic training dataset 107 builds to increase the density of the variable space for the associated deployment scenario.

Figure 2:
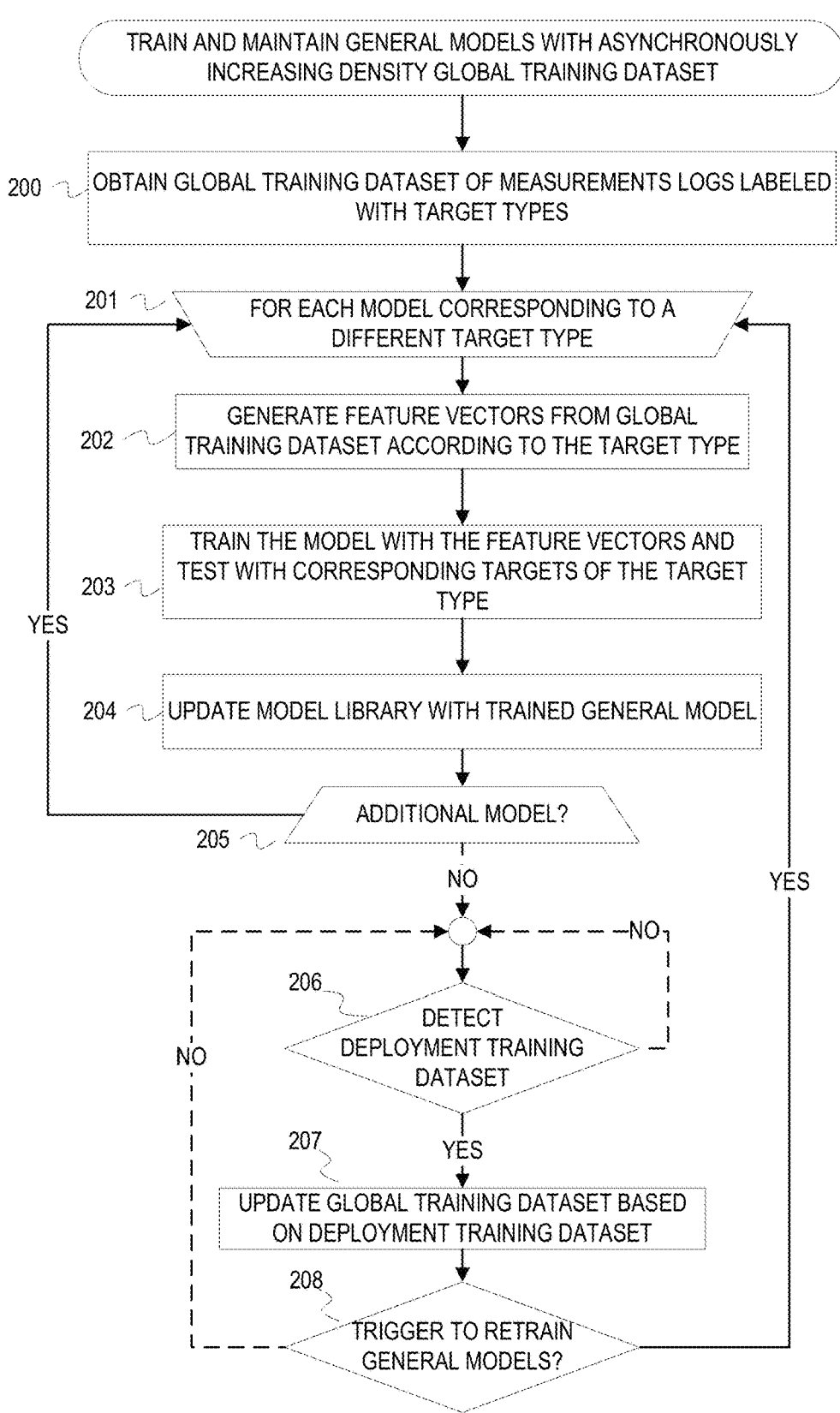
FIG. 2 is a flowchart of example operation to train and maintain general models with an asynchronously increasing density global training dataset.

FIG. 2 is a flowchart of example operation to train and maintain general models with an asynchronously increasing density global training dataset. The example operations of FIG. 2 are described with reference to an adaptable model framework. Multiple program codes and corresponding processes can embody the adaptable model framework. For instance, one process(es) may maintain the global training dataset, another process(es) may select and invoke learners, and another process(es) may support an interface for deployment requests. The set of adaptable general models can be maintained as a library hosted on remote servers, for example as a cloud service. A model can be requested for a deployment scenario via an interface (e.g., web based interface) that allows specification of a model type, target type, etc. The interface may also present an option to accept download of an agent that facilitates feedback of deployment scenario training datasets back to framework for updating the global training dataset. To facilitate supplying the feedback, an agent can specify a repository or location for submitting or communicating a deployment scenario training dataset. This can also be implemented via an interface, defined or determined by the agent, presented to users or processes of the deployment scenario. The operations of FIG. 3 can be repeated for every model and corresponding target type. Like mentioned earlier, the global training dataset is generated from synthetic data and maps, but sparsely populates, the high dimensionality feature space. The example operation can begin as supervised learning to first generate and deploy the general models. As data is supplied back to the global training dataset, the operation can shift to unsupervised learning as the global training dataset updates.

At block 200, the adaptable model framework obtains a global training dataset of measurement logs labeled with targets of varying types of petrophysical parameters. The measurement logs obtained comprise nuclear measurements that are obtained from various sources such as historical data and synthetically generated data. The measurement logs are labeled with predictors/targets to generate a training dataset for the general models.

The global training dataset can comprise other measurement logs such as acoustic measurement logs. Embodiments can maintain a global training dataset for each type of measurement. For instance, a global training dataset of acoustic measurements can be maintained, and a global training dataset of nuclear measurements can be maintained.

At block 201, the adaptable model framework selects a learner or model for a different target type for training with the global training dataset. For instance, the adaptable model framework selects a model to train to predict porosity and then selects a model to train to predict lithology. The base models to train may be the same (e.g., both based on artificial neural networks (ANNs)) or different (e.g., a decision tree and an ANN). Domain knowledge and/or model performance evaluation can guide the selection of learner per type of petrophysical parameter to predict. The adaptable model framework will select a model each iteration. Additional examples of different target types include porosity, permeability, water saturation, lithology, machine wear time, and production forecast.

At block 202, the adaptable model framework generates feature vectors from the global training dataset. Assuming a tabular format for the global training dataset, the adaptable model framework instantiates a feature vector for each row of data in the global training dataset. Some of the data in the global training dataset may be preprocessed prior to being used to populate a feature vector or may be preprocessed when included in the global training dataset. The label or target for each feature vector will depend on the target type. For example, the targets of a feature vector for porosity will differ from the targets of a feature vector for water saturation. Within the global training dataset, an observation (e.g., row) can include the features associated with the targets of different target types. The feature vector format will also depend on the type of model being used.

At block 203, the adaptable model framework trains the selected model with the generated feature vectors and tests the predictions against the associated targets of the target type. The adaptable model framework can pass the feature vectors individually or in batch to the learner or machine learning algorithm along with the associated predictors/targets of the target type of the current iteration.

At block 204, the adaptable model framework updates a model library with the trained general model. The model library comprises trained models for different target types that can be deployed for deployment scenarios. Embodiments are not limited to having a single general model for each target type. The adaptable model framework can train different types of learners for a same target type to allow for user selection/preference.

At block 205, the adaptable model framework determines whether there is an additional model to train. If there is an additional model to train, the operational flow returns to block 201 for the adaptable model framework to select a next model. If not, then operational flow proceeds to block 206.

At block 206, the adaptable model framework detects deployment training datasets. Deployment training datasets are generated by deployment adapted models of deployment scenarios and supplied back for updating the global training dataset. Deployment training datasets can be associated with a variety of target types from various deployment scenarios. Deployment training datasets may come from deployment scenarios such as porosity of a formation that contains specific lithology matrix from a region in the Middle East or a target type from all cased wellbores in every region where nuclear measurements have been obtained. Generating deployment training datasets will be discussed in the flowchart below. If the adaptable model framework detects a deployment training dataset, then operational flow proceeds to block 207. Otherwise, the operational flow asynchronously flow returns to 206. The adaptable model framework may monitor a storage space or receive notifications to detect deployment training datasets.

At block 207, the adaptable model framework updates the global training dataset based on the deployment training dataset. The deployment training datasets will be added to the global training dataset to increase the density of the global training dataset and fill the high dimensionality feature space. Prior to being incorporated into the global training dataset, the deployment training dataset may be processed (e.g., filtered, aggregated, etc.) such that the deployment training dataset is properly formatted to be added to the global training dataset.

At block 208, the adaptable model framework determines if the update of the global training dataset based on the deployment training dataset triggers the adaptable model framework to retrain the general models with the updated global training dataset. The general models will be retrained such that they are updated to fit the updated global training dataset. Updating the general models increases accuracy when deployed. Embodiments can implement the retrain trigger with different conditions. The size of the deployment training dataset can trigger the general models to be retrained. For example, a threshold of 10% can be put in place so that the adaptable model framework retrains the general models when the new deployment training dataset makes up at least 10% of the updated global training dataset. The amount of deployment training dataset updates from the previous training can trigger the general models to be retrained. For example, if a threshold of 5 updates is in place, the general models will be retrained each 5 dataset updates. The program code could also be triggered to update the general models when the global training set is updated with a deployment training datasets of a specific target type. For example, if a deployment training dataset of permeability is detected, the general models will be retrained with the updated global training set. If retraining is triggered, operational flow returns to block 201. Otherwise, operational flow asynchronously returns to block 296.

FIG. 3 is a flowchart of example operations for adapting a general model to a deployment scenario and providing deployment-based feedback to the unified adaptable model framework. The example operations of FIG. 3 are described with reference to an agent of the unified adaptable model framework. Embodiments may deploy an agent with a general model to a deployment scenario. The agent can be programmed to facilitate the feedback of the deployment scenario training data to the framework. However, it is not necessary for embodiments to employ an agent. A general model can be deployed with instructions/requests for providing deployment scenario training data. The operations in FIG. 3 can be repeated for every general model in the model library deployed to a deployment scenario and can be repeated for various deployment scenarios. Various deployment scenarios can include a geologic scenario, a wellbore configuration scenario, or a combination of deployment scenarios. The deployment scenarios are not limited to geologic and wellbore configuration scenarios. As mentioned earlier, the deployment-based feedback is intended to populate the feature space to reduce sparseness and increase the accuracy of the general models when deployed.

At block 300, an agent obtains one or more general models for a deployment scenario. The general models correspond to different target types as noted earlier. Multiple models may be deployed for a deployment scenario. For example, if porosity and permeability were the desired target types for a deployment scenario, then the general model corresponding to porosity and the general model corresponding to permeability can be deployed for the deployment scenario. The models do not have to be of similar model type. For example, the general porosity model can be a random forest and the permeability model can be an artificial neural network model. The general models are also not limited to being deployed to a specific deployment scenario. For example, the general porosity model can be deployed for a scenario with a formation that contains specific lithology matrix from a region in the Middle East or a scenario that covers all cased wellbores.

At block 301, the agent begins selecting each obtained model for adapting to the deployment scenario.

At block 302, the agent obtains a training dataset for the deployment scenario based on the target type of the model. The training dataset can include expertly labeled nuclear measurements and computer generated datapoints. The training dataset can include datapoints from a single well, a group of wells with similar reservoirs, a group of wells that represent a field or region, or all wells with measurement log data that have one or more specific wellbore configurations.

At block 303, the agent generates feature vectors from the deployment scenario training dataset. While the structure of the feature vector will be compatible with the general model, the deployment scenario training dataset does not necessarily include all of the features that were used to train the general model. The general model can be fit to a deployment scenario with some features left as null or empty values in the feature vector. For example, if a general porosity model is trained to accept 40 features, then the deployment adapted porosity model can accept 1 to 40 features.

At block 304, the agent trains the general model to obtain a deployment adapted model for use in the deployment scenario. The agent invokes a training algorithm corresponding to the general model passes the generated feature vectors to the invoked training algorithm.

At block 305, the agent provides the deployment adapted model for use in the deployment scenario. The agent can load the deployment adapted model into a system associated with logging and/or analysis. The agent may store the deployment adapted model to a specified location and generate a notification that the model is ready for use.

At block 306, the agent determines if there is an additional general models to adapt to the deployment scenario. If there is an additional general model, then operational flow returns to block 301. Otherwise, operational flow continues to block 307.

At block 307, the agent supplies each training dataset for the deployment scenario for updating the global training dataset. As stated earlier, the training dataset is supplied back to the global training dataset to increase the density of the global training dataset and fill the feature space, which is then used to train and update the general models for increased accuracy.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, which employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 4:
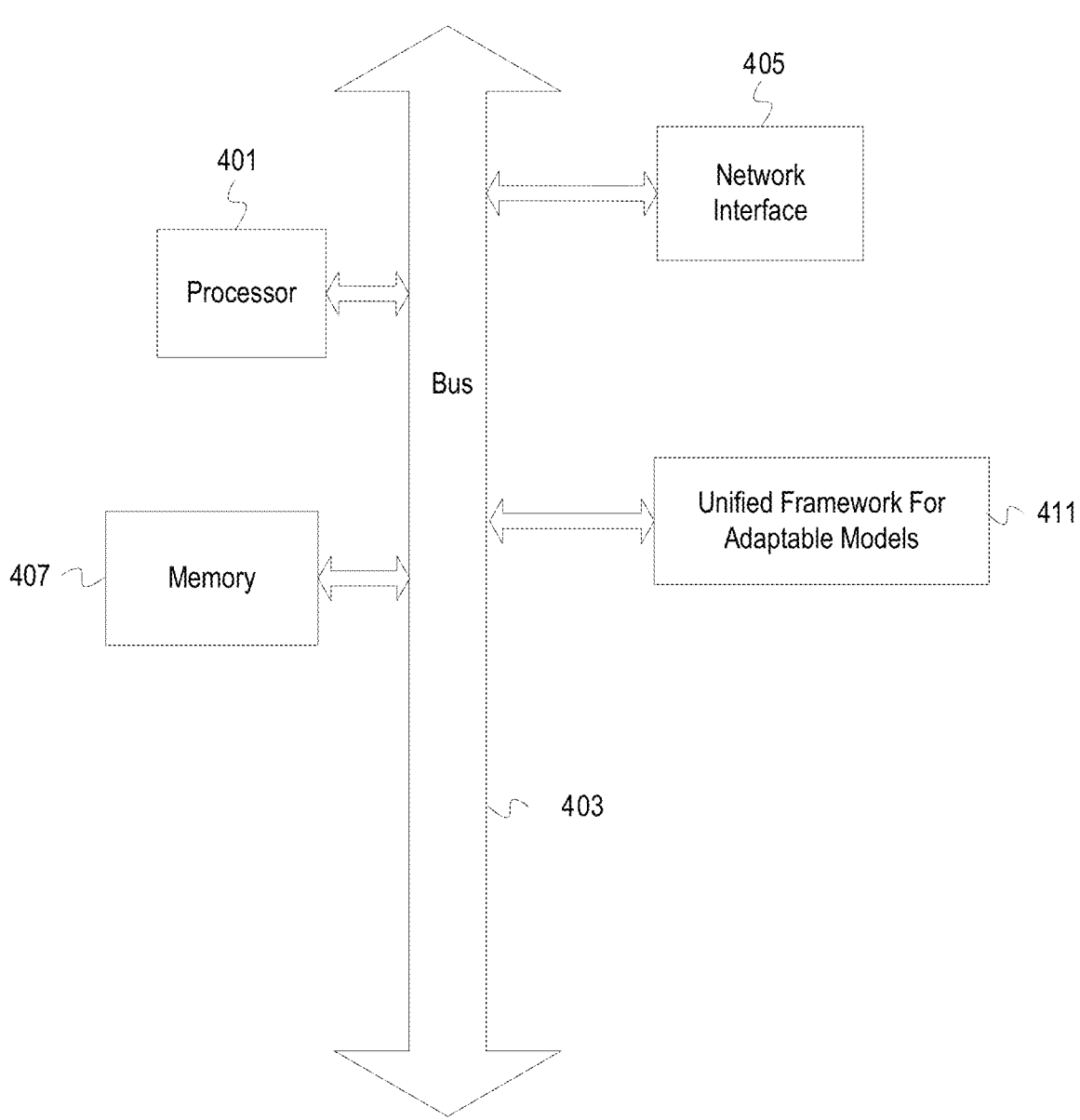
FIG. 4 depicts an example computer system with a unified framework for adaptable models for generating petrophysical parameters.

FIG. 4 depicts an example computer system with a unified framework for adaptable models for generating petrophysical parameters. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system communicates via transmissions to and/or from remote devices via the network interface 405 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The system also includes a unified framework for adaptable models 411. The unified adaptable models framework 411 creates and maintains a set of adaptable general models that can be deployed and efficiently trained to fit various deployments. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

While the aspects of the disclosure are described with reference to various implementations and exploitations, it will be understood that these aspects are illustrative and that the scope of the claims is not limited to them. In general, techniques for creating and maintaining a unified framework of adapted models as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Embodiment 1: A method comprising: obtaining a first training dataset that sparsely populates a high dimensionality feature space, wherein the first training dataset is based on measurement logs; training a first set of one or more models with the first training dataset to obtain a first set of one or more trained models; deploying a first of the first set of trained models to a plurality of different deployment scenarios; based on detection of deployment based training datasets corresponding to field observations for at least a subset of the plurality of deployment scenarios, updating the first training dataset based on the training datasets corresponding to the subset of deployment scenarios to increase density of the feature space corresponding to the first training dataset; and training the first set of trained models with the updated first training dataset.

Embodiment 2: The method of Embodiment 1, wherein training the first set of models comprises training at least one of the first set of models for each of a plurality of target types corresponding to petrophysical parameters.

Embodiment 3: The method of Embodiment 1 further comprising: for a first of the plurality of deployment scenarios, training the first trained model with a second training dataset corresponding to the first deployment scenario to obtain a first deployment adapted trained model; and generating at least a subset of a first of the deployment based training datasets from the first deployment adapted trained model.

Embodiment 4: The method of Embodiment 1, wherein the measurement logs of the first training dataset comprise synthetic measurement logs.

Embodiment 5: The method of Embodiment 4, wherein the measurement logs of the first training dataset further comprise historical field observations.

Embodiment 6: The method of Embodiment 1, wherein the measurement logs comprise nuclear measurement logs.

Embodiment 7: The method of Embodiment 1, further comprising determining that detection of deployment based training datasets corresponding to field observations satisfies a criterion that triggers updating of the first training dataset, wherein updating the first training dataset is responsive to determining that the criterion is satisfied.

Embodiment 8: A non-transitory, machine-readable media comprising program code stored thereon, the program code comprising program code to: obtain a first training dataset that sparsely populates a high dimensionality feature space, wherein the first training dataset is based on measurement logs; train a first set of one or more models with the first training dataset to obtain a first set of one or more trained models; deploy a first of the first set of trained models to a plurality of different deployment scenarios; based on detection of deployment based training datasets corresponding to field observations for at least a subset of the plurality of deployment scenarios, update the first training dataset based on the training datasets corresponding to the subset of deployment scenarios to increase density of the feature space corresponding to the first training dataset; and train the first set of trained models with the updated first training dataset.

Embodiment 9: The non-transitory, machine-readable media of Embodiment 8, wherein the program code to train the first set of models comprises program code to train at least one of the first set of models for each of a plurality of target types corresponding to petrophysical parameters.

Embodiment 10: The non-transitory, machine-readable media of Embodiment 8 further comprising program to: for a first of the plurality of deployment scenarios, train the first trained model with a second training dataset corresponding to the first deployment scenario to obtain a first deployment adapted trained model; and generate at least a subset of a first of the deployment based training datasets from the first deployment adapted trained model.

Embodiment 11: The non-transitory, machine-readable media of Embodiment 8, wherein the measurement logs of the first training dataset comprise synthetic measurement logs.

Embodiment 12: The non-transitory, machine-readable media of Embodiment 11, wherein the measurement logs of the first training dataset further comprise historical field observations.

Embodiment 13: The non-transitory, machine-readable media of Embodiment 8, wherein the measurement logs comprise nuclear measurement logs.

Embodiment 14: The non-transitory, machine-readable media of Embodiment 8, further comprising program code to determine whether detection of deployment based training datasets corresponding to field observations satisfies a criterion that triggers updating of the first training dataset, wherein the program code to update the first training dataset comprises the program code to update the first training dataset responsive to a determination that the criterion is satisfied.

Embodiment 15: An apparatus comprising: a processor; and a machine-readable medium having program code executable by the processor to cause the apparatus to: obtain a first training dataset that sparsely populates a high dimensionality feature space, wherein the first training dataset is based on measurement logs; train a first set of one or more models with the first training dataset to obtain a first set of one or more trained models; deploy a first of the first set of trained models to a plurality of different deployment scenarios; based on detection of deployment based training datasets corresponding to field observations for at least a subset of the plurality of deployment scenarios, update the first training dataset based on the training datasets corresponding to the subset of deployment scenarios to increase density of the feature space corresponding to the first training dataset; and train the first set of trained models with the updated first training dataset.

Embodiment 16: The apparatus of Embodiment 15, wherein the program code to train the first set of models comprises program code to train at least one of the first set of models for each of a plurality of target types corresponding to petrophysical parameters.

Embodiment 17: The apparatus of Embodiment 15, wherein the machine-readable medium further has program code to: for a first of the plurality of deployment scenarios, train the first trained model with a second training dataset corresponding to the first deployment scenario to obtain a first deployment adapted trained model; and generate at least a subset of a first of the deployment based training datasets from the first deployment adapted trained model.

Embodiment 18: The apparatus of Embodiment 15, wherein the measurement logs of the first training dataset comprise synthetic measurement logs.

Embodiment 19: The apparatus of Embodiment 18, wherein the measurement logs of the first training dataset further comprise historical field observations.

Embodiment 20: The apparatus of Embodiment 15, wherein the machine-readable medium further has program code to determine whether detection of deployment based training datasets corresponding to field observations satisfies a criterion that triggers updating of the first training dataset, wherein the program code to update the first training dataset comprises the program code to update the first training dataset responsive to a determination that the criterion is satisfied.

What is claimed is:

1. A method comprising:

obtaining a first training dataset that populates a first subset of a high dimensionality feature space, wherein the first training dataset is based on measurement logs;

training a first model using the first training dataset to obtain a first trained model;

deploying the first trained model to a plurality of different deployment scenarios, wherein each deployment scenario is associated with a different target type;

training the first trained model using a second training dataset to obtain a second trained model, wherein the second training dataset comprises field observations associated with a first deployment scenario of the deployment scenarios, wherein the second training dataset populates a second subset of the high dimensionality feature space;

generating, by the second trained model, first predictions based on measurements associated with a formation, wherein the measurements are associated with a first target type;

determining that a first prediction of the first predictions is valid and a second prediction of the first predictions is invalid, wherein said determining that the first prediction of the first predictions is valid and the second prediction of the first predictions is invalid comprises determining that the first prediction satisfies a criterion that triggers updating of the first training dataset and the second prediction does not satisfy the criterion;

in response to determining that the criterion is satisfied by the first prediction, updating the first training dataset to include the first prediction but not the second prediction; and training a third model using the updated first training dataset to obtain a third trained model.

2. The method of claim 1, wherein training the first model comprises training the first model for a target type corresponding to a petrophysical parameter.

3. The method of claim 1, wherein the measurement logs comprise synthetic measurement logs.

4. The method of claim 3, wherein the measurement logs further comprise historical field observations.

5. The method of claim 1, wherein the measurement logs comprise nuclear measurement logs.

6. A non-transitory, machine-readable media comprising program code stored thereon, the program code comprising program code to:

obtain a first training dataset that populates a first subset of a high dimensionality feature space, wherein the first training dataset is based on measurement logs;

train a first model using the first training dataset to obtain a first trained model;

deploy the first trained model to a plurality of different deployment scenarios, wherein each deployment scenario is associated with a different target type;

train the first trained model using a second training dataset to obtain a second trained model, wherein the second training dataset comprises field observations associated with a first deployment scenario of the deployment scenarios, wherein the second training dataset populates a second subset of the high dimensionality feature space;

generate, by the second trained model, first predictions based on measurements associated with a formation, wherein the measurements are associated with a first target type;

determine that a first prediction of the first predictions is valid and a second prediction of the first predictions is invalid, wherein the program code to determine that the first prediction of the first predictions is valid and the second prediction of the first predictions is invalid comprises program code to determine that the first prediction satisfies a criterion that triggers updating of the first training dataset and the second prediction does not satisfy the criterion;

responsive to a determination that the criterion is satisfied by the first prediction, update the first training dataset to include the first prediction but not the second prediction; and train a third model using the updated first training dataset to obtain a third trained model.

7. The non-transitory, machine-readable media of claim 6, wherein the program code to train the first model comprises program code to train the first model for a target type corresponding to a petrophysical parameter.

8. The non-transitory, machine-readable media of claim 6, wherein the measurement logs comprise synthetic measurement logs.

9. The non-transitory, machine-readable media of claim 8, wherein the measurement logs further comprise historical field observations.

10. The non-transitory, machine-readable media of claim 6, wherein the measurement logs comprise nuclear measurement logs.

11. An apparatus comprising:

a processor; and a machine-readable medium having program code executable by the processor to cause the apparatus to:

obtain a first training dataset that populates a first subset of a high dimensionality feature space, wherein the first training dataset is based on measurement logs;

train a first model using the first training dataset to obtain a first trained model;

deploy the first trained model to a plurality of different deployment scenarios, wherein each deployment scenario is associated with a different target type;

train the first trained model using a second training dataset to obtain a second trained model, wherein the second training dataset comprises field observations associated with a first deployment scenario of the deployment scenarios, wherein the second training dataset populates a second subset of the high dimensionality feature space;

generate, by the second trained model, first predictions based on measurements associated with a formation, wherein the measurements are associated with a first target type;

determine that a first prediction of the first predictions is valid and a second prediction of the first predictions is invalid, wherein the program code to determine that the first prediction of the first predictions is valid and the second prediction of the first predictions is invalid comprises program code to determine that the first prediction satisfies a criterion that triggers updating of the first training dataset and the second prediction does not satisfy the criterion;

responsive to a determination that the criterion is satisfied by the first prediction, update the first training dataset to include the first prediction but not the second prediction; and train a third model using the updated first training dataset to obtain a third trained model.

12. The apparatus of claim 11, wherein the program code to train the first model comprises program code to train the first model for target type corresponding to a petrophysical parameter.

13. The apparatus of claim 11, wherein the measurement logs comprise synthetic measurement logs.

14. The apparatus of claim 13, wherein the measurement logs further comprise historical field observations.

* * * * *